(12) United States Patent
Bang et al.

(10) Patent No.: US 7,423,829 B2
(45) Date of Patent: Sep. 9, 2008

(54) CIRCUIT FOR FLYING HEIGHT ON DEMAND

(75) Inventors: Hoyul Bang, Saratoga, CA (US); Sang Y. Lee, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 184 days.

(21) Appl. No.: 11/387,472

(22) Filed: Mar. 22, 2006

(65) Prior Publication Data

US 2007/0223130 A1   Sep. 27, 2007

(51) Int. Cl.
*G11B 21/02* (2006.01)
(52) U.S. Cl. .................................................. 360/75
(58) Field of Classification Search ............. None
See application file for complete search history.

(56) References Cited

U.S. PATENT DOCUMENTS 5,991,113 A * 11/1999 Meyer et al. ............ 360/75
7,023,647 B2 * 4/2006 Bloodworth et al. ....... 360/75
7,088,543 B2 * 8/2006 Satoh et al. ............... 360/75
2003/0099054 A1 * 5/2003 Kamijima ................. 360/59
2004/0027728 A1 * 2/2004 Coffey et al. ............. 360/313
2006/0139789 A1 * 6/2006 Yang ........................ 360/75

* cited by examiner

*Primary Examiner*—Joseph Feild
*Assistant Examiner*—Dan I Davidson
(74) *Attorney, Agent, or Firm*—Ben J. Yorks; Irell & Manella LLP

(57) ABSTRACT

A hard disk drive with a control circuit that controls a heating element in a head of the drive. The heating element is driven by a voltage. The control circuit varies the voltage during read and write operations of the drive. The voltages are varied to minimize fluctuations in the flying height of the drive during the write operations.

26 Claims, 7 Drawing Sheets

CIRCUIT FOR FLYING HEIGHT ON DEMAND

BACKGROUND OF THE INVENTION

1. Field of the Invention

The present invention relates to controlling a flying height of a head of a hard disk drive.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a suspension arm to create an subassembly commonly referred to as a head gimbal assembly ("HGA"). The HGA's are attached to an actuator arm which has a voice coil motor that can move the heads across the surfaces of the disks.

Each head has an air bearing surface that cooperates with an air flow generated by the rotating disk to create an air bearing. The air bearing prevents mechanical wear between the head and the disk.

The MR heads are typically constructed from a material that is sensitive to temperature. Most commercially available MR heads undergo a significant degradation of performance when the head temperature falls below a threshold value. This head degradation may increase the bit error rate of the disk drive to an unacceptable level.

Some drives contain heads that have integral heating elements. The heating elements generate heat so that the heads operate in a desirable temperature range. FIGS. 1 and 2 show a prior art heater control circuit 1 and corresponding timing diagram, respectively, for a heating element of a head. The control circuit 1 contains a pair of registers 2 and 3 within a preamp 4 of a disk drive. The register values are provided by a controller 5. The controller 5 controls the read and write operations of the disk drive. The contents of the registers 2 and 3 establish an amplitude of a voltage supplied to a heater 6 of a head.

The amplitude of the voltage controls how much heat is generated by the heater 6. The output of the registers 2 and 3 is converted from digital to analog form by a digital to analog converter ("DAC") 7 and amplified by driver circuit 8. The contents of register 2 determines the value of the voltage during a read operation and the contents of register 3 determines the voltage amplitude during a write operation. The use of either register 2 or 3 is selected by the controller thru load circuit 9 and corresponding R/W signals.

As shown by the timing diagram of FIG. 2, during a write operation, a voltage of approximately 2 V is applied to the heater. In a write operation, a current is provided to a write element of the head. The current generates heat that increases the temperature of the head. The increase in temperature reduces the flying height of the head as shown in the diagram. During a read operation current is no longer provided to the write element. The read element receives a nominal biasing current but this does not generate any appreciable amount of heat. Consequently, the head temperature falls and the flying height increases. The voltage to the heater is increased to minimize the variation in flying height between the read and write operations. A subsequent write operation will cause a corresponding rise in temperature and a reduction in the flying height.

The variation in flying height during the write operation complicates the writing process and may even result in corrupt data. It would be desirable to minimize the fluctuations in flying height during and between the read and write modes for a head with a heating element.

BRIEF SUMMARY OF THE INVENTION

A hard disk drive that includes a head that has a heating element and a control circuit that provides a varying voltage to the heating element during a write operation of the disk drive.

DETAILED DESCRIPTION

Disclosed is a hard disk drive with a control circuit that controls a heating element in a head of the drive. The heating element is driven by a voltage. The control circuit varies the voltage during read and write operations of the drive. The voltages are varied to minimize fluctuations in the flying height of the drive during the write operations.

Figure 3:
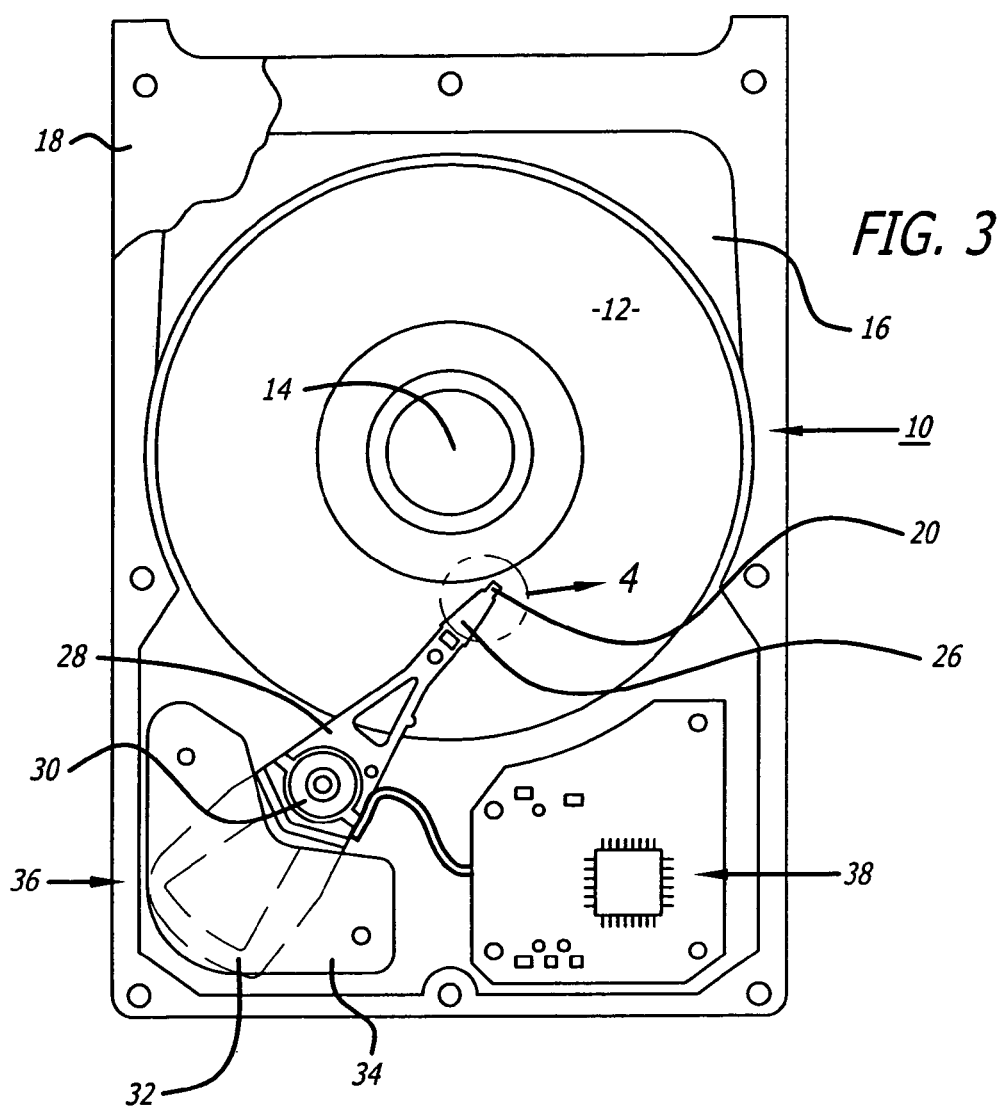
FIG. 3 is a top view of an embodiment of a hard disk drive.

Referring to the drawings more particularly by reference numbers, FIG. 3 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 4:
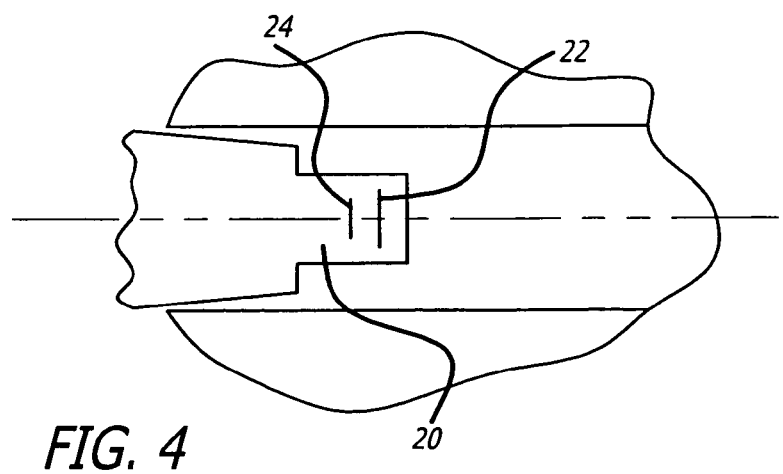
FIG. 4 is a top enlarged view of a head of the hard disk drive.

The disk drive 10 may include a plurality of heads 20 located adjacent to the disks 12. As shown in FIG. 4 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Each head 20 may be mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12. The hard disk drive 10 may include a printed circuit board assembly 38.

Figure 5:
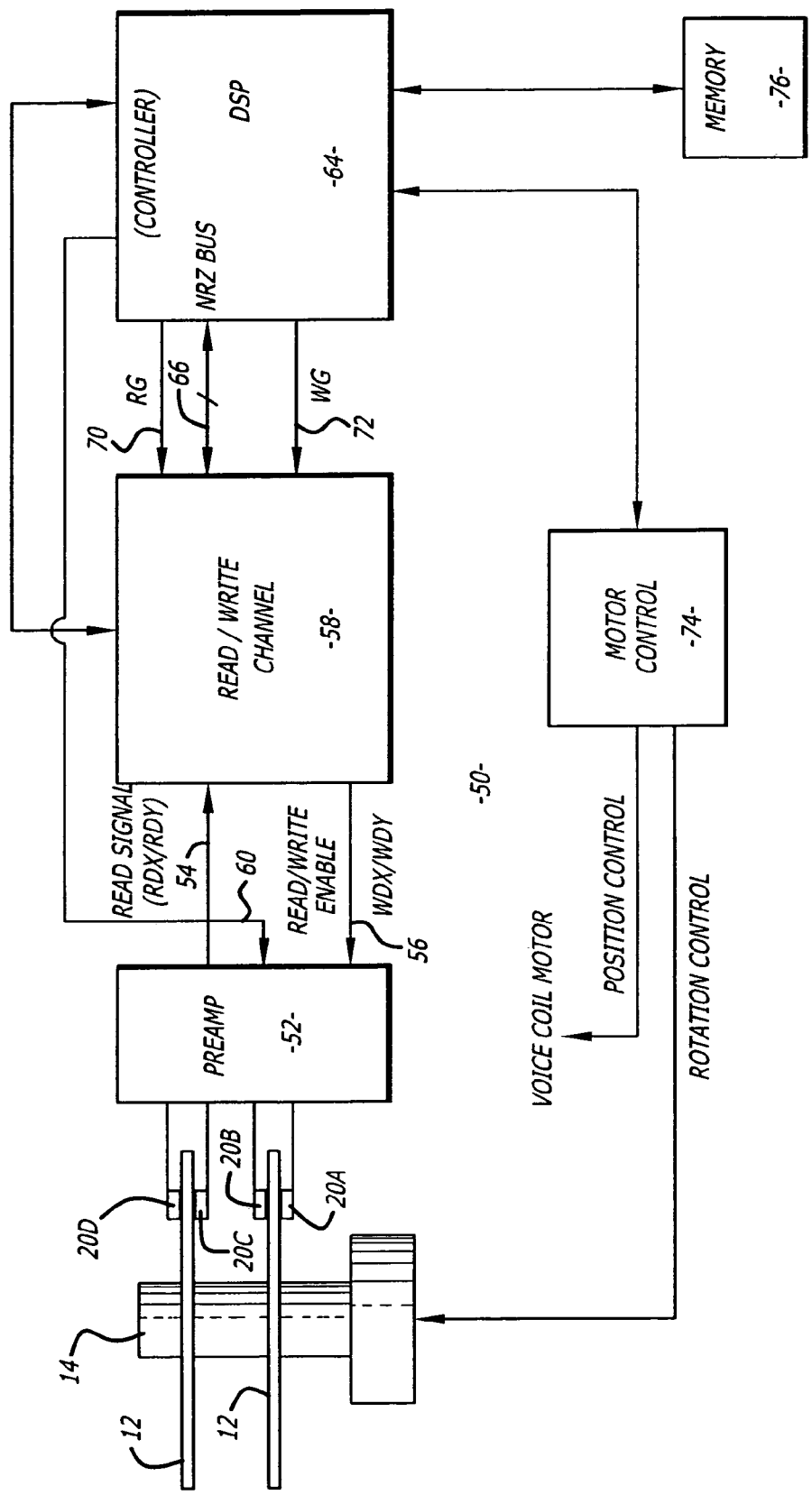
FIG. 5 is a schematic of an electrical system of the hard disk drive.

FIG. 5 shows an electrical circuit 50 for reading and writing data onto the disks 12. The circuit 50 may include a pre-amplifier circuit 52 that is coupled to the heads 20. The pre-amplifier circuit 52 has a read signal (Rdx/Rdy) 54 and a write signal wdx/wdy 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through 66, a NRZ (no return to zero) Bus and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil 32 and spindle motor 14 of the disk drive 10. The controller 64 may be connected to a memory device 76. By way of example, the device 76 may contain instructions that are read by the controller 64.

Figure 6:
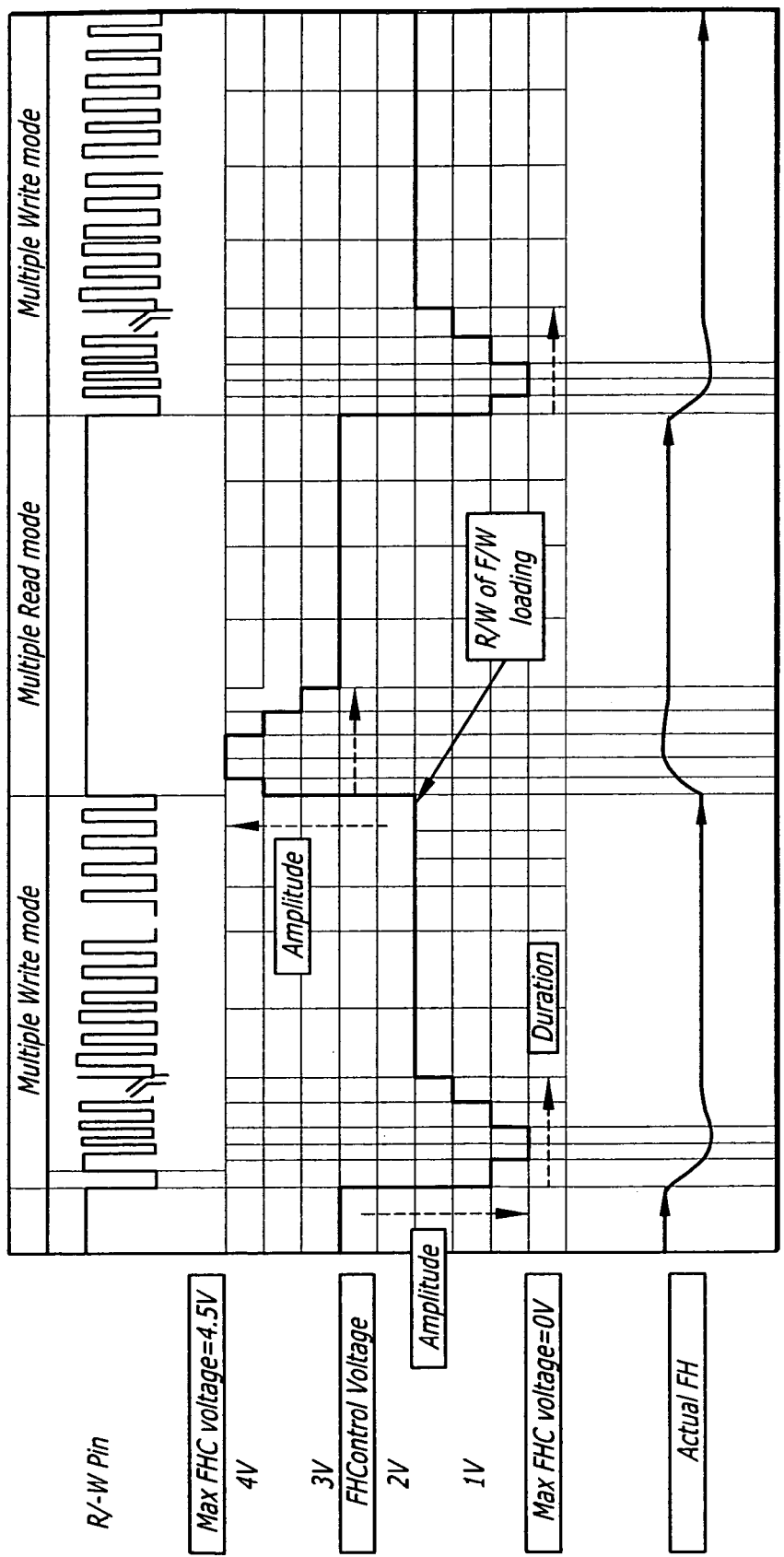
FIG. 6 is a timing diagram showing driving signals for a heating element of a head.
Figure 7:
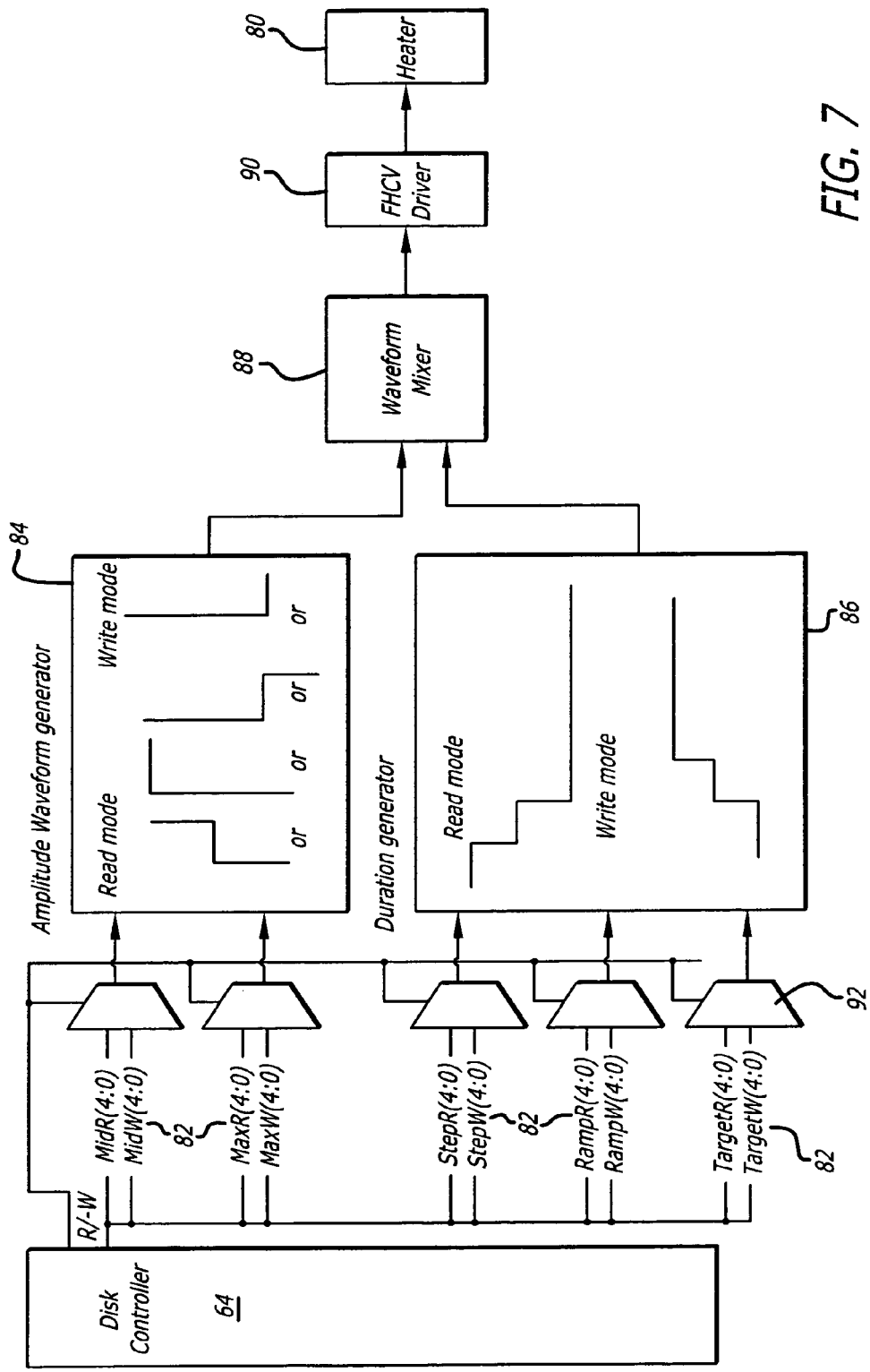
FIG. 7 is a schematic of a control circuit used to control the heating element.

FIGS. 6 and 7 show a timing diagram and a circuit, respectively, for controlling a heating element 80 of a head 20. The circuit provides a varying voltage to the heating element 80 during a write operation. Additionally, the circuit may provide a varying voltage to the heating element during a read operation.

By way of example, when a write operation is initiated the voltage may drop from a value of 3 V to 1.0V and then to 0.5 V as shown in FIG. 6. The voltage may then ramp up to 2 V. The reduction in voltage and slow ramp up reduces the heat generated by the heating element 80 during a write operation.

Figure 1:
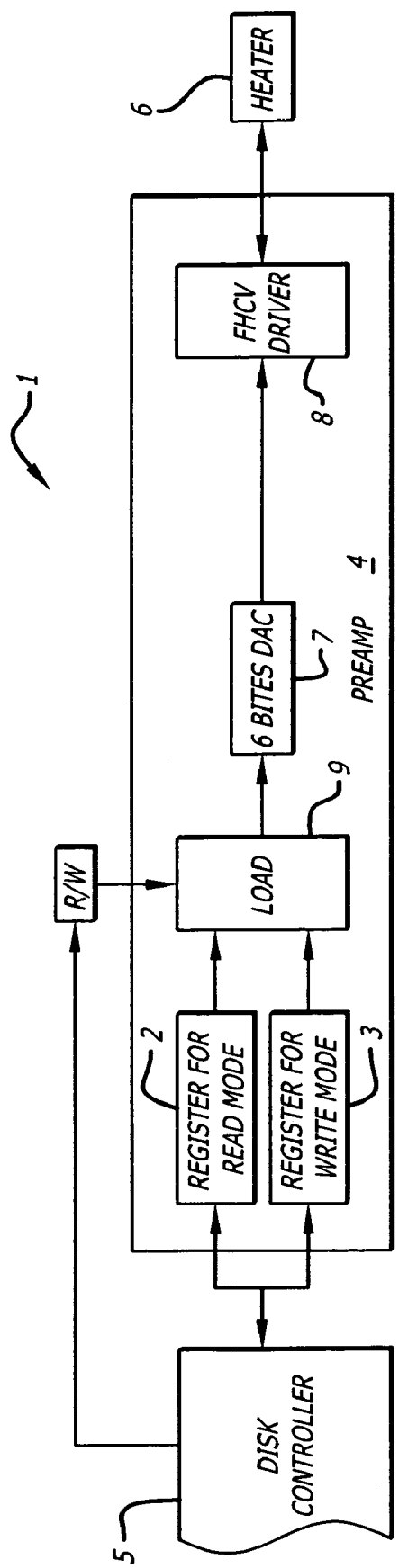
FIG. 1 is a schematic of a heater control circuit of the prior art.
Figure 2:
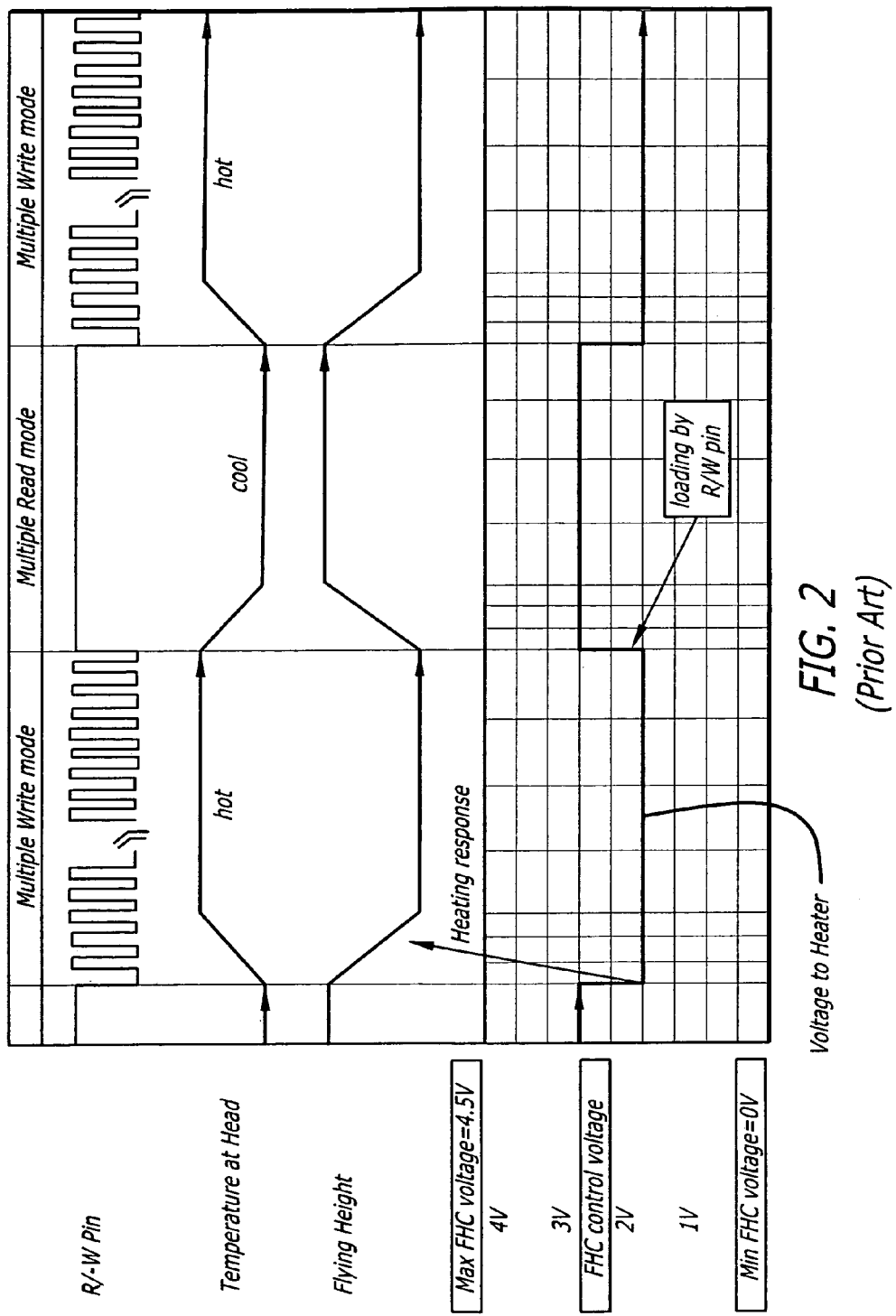
FIG. 2 is a timing diagram for the heater control circuit shown in FIG. 1.

When a read operation is initiated the voltage may be increased to a level of 4.0V and then 4.5 V before being ramped down to 3 V. This increase in voltage causes the heating element to generate heat during the read operation which in general creates less heat than a write operation. FIG. 6 shows the resulting flying height FH of the head. Comparing FIG. 6 with the prior art shown in FIG. 1 it can be seen that the flying height has smaller swings when the heating element is driven with varying voltages. Smaller swings in the flying height allows for less complex writing algorithms and more uniform magnetic flux densities in the disks.

FIG. 7 shows an embodiment of a circuit to control the heating element 80. The controller 64 may include a plurality of registers 82. The circuit may include an amplitude waveform generator 84 and a duration generator 86. The outputs of the generators 84 and 86 may be mixed by a waveform mixer 88, amplified by a driver 90 and provided to the heating element 80.

The contents of the registers 82 may be loaded into the generators 84 and 86 thru multiplexors 92. Each multiplexor 92 may be connected to a pair of registers. Each register pair includes a READ register and a WRITE register. The channel select pins of the multiplexors 92 are connected to a R/-W line of the controller 64. By way of example, when the R/-W line is high, the READ register values are provided to the generators 84 and 86. When the R/-W line is low, the WRITE register values are provided to the generators 84 and 86.

Figure 8:
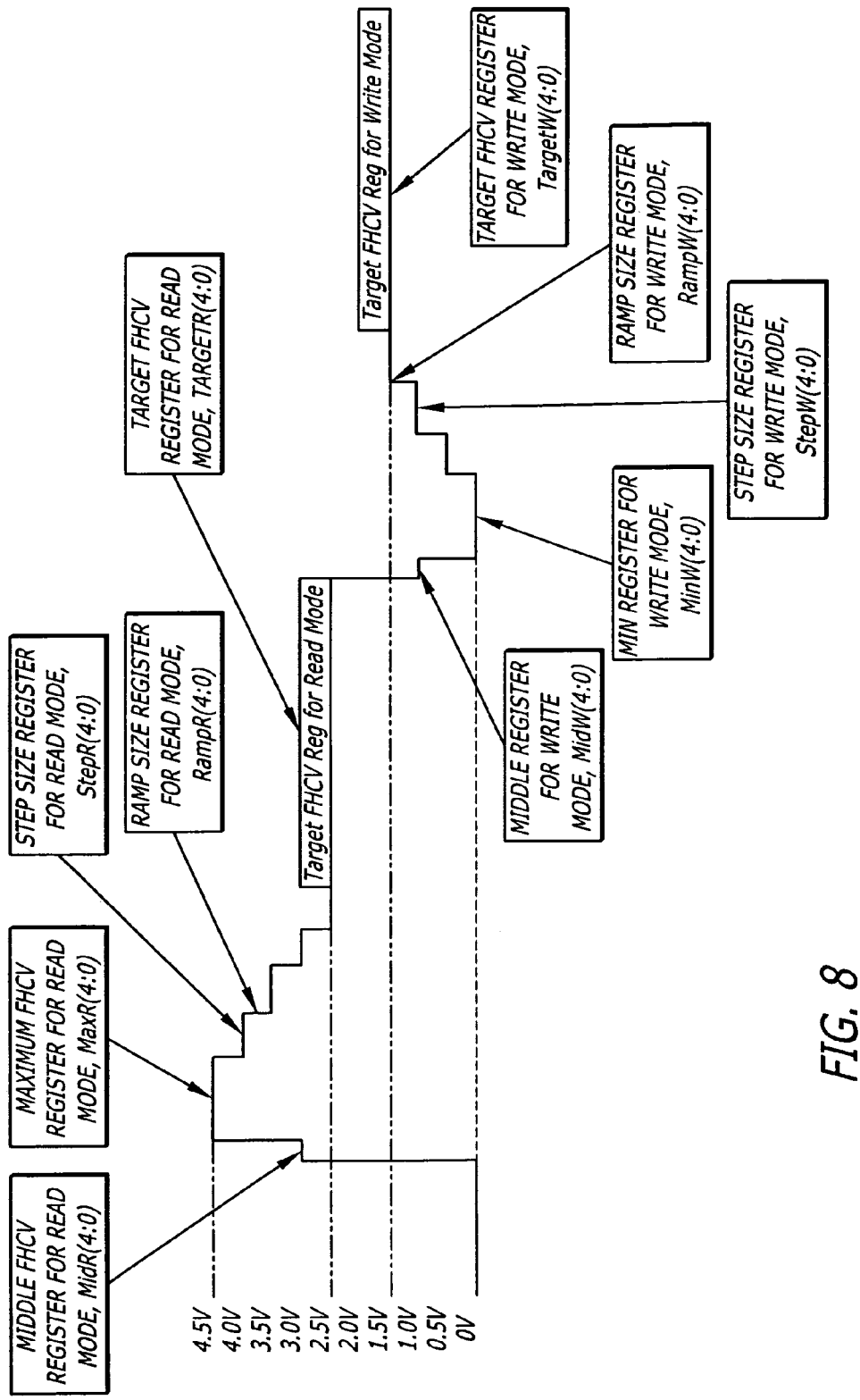
FIG. 8 is an illustration of a waveform and corresponding relationships with registers of the control circuit.

FIG. 8 shows a waveform for the heating element voltage and the relationship with the READ and WRITE registers 82 shown in FIG. 7. The MIDR and MIDW registers establish the first step during the read and write operations, respectively. The MAXR and MAXW registers define the maximum read and write values, respectively. The STEPR/STEPW and RAMPR/RAMPW registers, respectively, provide the durations of a step and the increases/decreases in voltage between steps for the read and write operations. The TARGETR and TARGETW registers establish the final target voltage during the read and write operations.

The registers 82, generators 84 and 86, and mixer 88 can be used to establish the waveform shown in FIG. 6. Although specific amplitudes, steps, etc. Are shown and described, it is to be understood that other waveforms and/or amplitudes may be used to minimize the fluctuations in flying height of the head.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a base plate;
   a spindle motor coupled to said base plate;
   a disk coupled to said spindle motor;
   an actuator arm mounted to said base plate;
   a voice coil motor coupled to said actuator arm;
   a head coupled to said actuator arm and said disk, said head having a write element, a read element and a heating element; and,
   a control circuit that provides a varying voltage with a plurality of steps to said heating element during a write operation, said voltage is varied in a plurality of increased steps to a desired predetermined level.

2. The hard disk drive of claim 1, wherein said control circuit provides a varying voltage to said heating element during a read operation.

3. The hard disk drive of claim 1, wherein said voltage initially decreases during said write operation.

4. The hard disk drive of claim 2, wherein said voltage initially increases during said read operation.

5. The hard disk drive of claim 1, wherein said voltage has a waveform that is defined by values stored in a plurality of registers.

6. The hard disk drive of claim 1, wherein said heating element varies a fly height of said head.

7. A hard disk drive, comprising:
   a base plate;
   a spindle motor coupled to said base plate;
   a disk coupled to said spindle motor;
   an actuator arm mounted to said base plate;
   a voice coil motor coupled to said actuator arm;
   a head coupled to said actuator arm and said disk, said head having a write element, a read element and a heating element; and,
   control means for varying a voltage with a plurality of steps that is provided to said heating element during a write operation, said voltage is varied in a plurality of increased steps to a desired predetermined level.

8. The hard disk drive of claim 7, wherein said control means provides a varying voltage to said heating element during a read operation.

9. The hard disk drive of claim 7, wherein said voltage initially decreases during said write operation.

10. The hard disk drive of claim 8, wherein said voltage initially increases during said read operation.

11. The hard disk drive of claim 7, wherein said voltage has a waveform that is defined by values stored in a plurality of registers.

12. The hard disk drive of claim 7, wherein said heating element varies a fly height of said head.

13. A method for controlling a fly height of a head during read and write operations of a hard disk drive, comprising:
applying a voltage to a heating element of a head; and,
performing a write operation while varying the voltage with a plurality of steps that is applied to the heating element, the voltage is varied in a plurality of increased steps to a desired predetermined level.

14. The method of claim 13, performing a read operation while varying a voltage to the heating element.

15. The method of claim 13, wherein the voltage initially decreases during the write operation.

16. The method of claim 14, wherein the voltage initially increases during the read operation.

17. A hard disk drive, comprising:
a base plate;
a spindle motor coupled to said base plate;
a disk coupled to said spindle motor;
an actuator arm mounted to said base plate;
a voice coil motor coupled to said actuator arm;
a head coupled to said actuator arm and said disk, said head having a write element, a read element and a heating element; and,
a control circuit that provides a varying voltage with a plurality of steps to said heating element during a read operation, said voltage is varied in a plurality of decreased steps to a desired predetermined level.

18. The hard disk drive of claim 17, wherein said voltage initially increases during said read operation.

19. The hard disk drive of claim 17, wherein said voltage has a waveform that is defined by values stored in a plurality of registers.

20. The hard disk drive of claim 17, wherein said heating element varies a fly height of said head.

21. A hard disk drive, comprising:
a base plate;
a spindle motor coupled to said base plate;
a disk coupled to said spindle motor;
an actuator arm mounted to said base plate;
a voice coil motor coupled to said actuator arm;
a head coupled to said actuator arm and said disk, said head having a write element, a read element and a heating element; and,
control means for varying a voltage with a plurality of steps that is provided to said heating element during a read operation, said voltage is varied in a plurality of decreased steps to a desired predetermined level.

22. The hard disk drive of claim 21, wherein said voltage initially increases during said read operation.

23. The hard disk drive of claim 21, wherein said voltage has a waveform that is defined by values stored in a plurality of registers.

24. The hard disk drive of claim 21, wherein said heating element varies a fly height of said head.

25. A method for controlling a fly height of a head during read and write operations of a hard disk drive, comprising:
applying a voltage to a heating element of a head; and,
performing a read operation while varying the voltage with a plurality of steps that is applied to the heating element, the voltage is varied in a plurality of decreased steps to a desired predetermined level.

26. The method of claim 25, wherein the voltage initially increases during the read operation.

* * * * *